W. T. HEAPS & W. THACKERAY.
HOG OILER.
APPLICATION FILED MAR. 14, 1916.
1,184,644. Patented May 23, 1916.
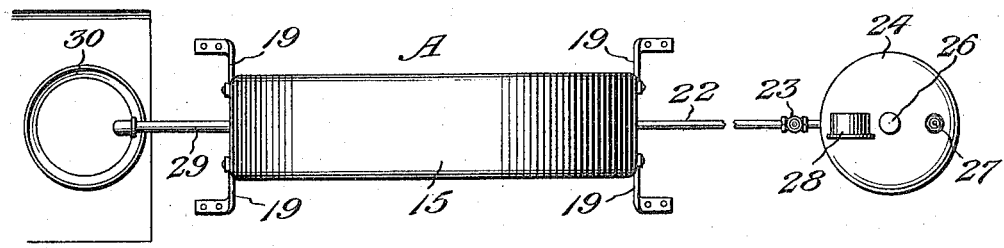
Fig. 1.
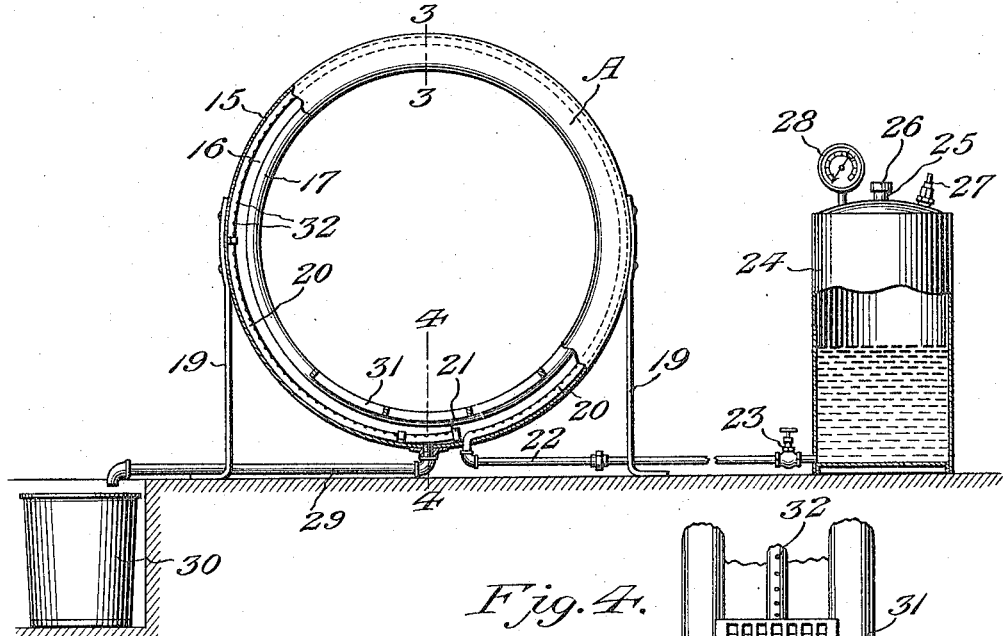
Fig. 2.
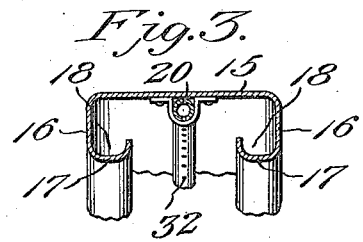
Fig. 3.
Fig. 4.
Witnesses
Edwin F. McKee
Inventors
Warren T. Heaps
William Thackeray
By Victor J. Evans
Attorney

UNITED STATES PATENT OFFICE.

WARREN T. HEAPS AND WILLIAM THACKERAY, OF KEWANEE, ILLINOIS.

HOG-OILER.

1,184,644.　　　　　Specification of Letters Patent.　　Patented May 23, 1916.

Application filed March 14, 1916.　Serial No. 84,179.

*To all whom it may concern:*

Be it known that we, WARREN T. HEAPS and WILLIAM THACKERAY, citizens of the United States, residing at Kewanee, in the county of Henry and State of Illinois, have invented new and useful Improvements in Hog-Oilers, of which the following is a specification.

This invention relates to devices for spraying hogs and other animals with oil or with fluids of any kind, medicated or otherwise, and it has for its object to produce a simple and effective device whereby an animal will be completely sprayed without danger of missing any portion and without waste of material.

A further object of the invention is to produce an annular spraying device through which the animal may be driven, the entire surface of the animal being exposed to the spray.

A further object of the invention is to produce an annular spraying device, the same consisting of an annular trough-shaped casing in which is located a spray pipe, that is connected with a source of supply, said casing being also provided with a discharge pipe whereby the surplus liquid will be carried to a receptacle and saved.

A further object of the invention is to produce an annular spraying device comprising a trough-shaped casing and a grating over which the animal that is to be sprayed may be driven.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a top plan view of a device constructed in accordance with the invention. Fig. 2 is a side elevation, partly in section. Fig. 3 is a sectional detail view taken on the line 3—3 in Fig. 2. Fig. 4 is a sectional detail view taken on the line 4—4 in Fig. 2.

Corresponding parts in the several figures are denoted by like characters of reference.

The improved spraying device comprises an annular casing A, said casing being of trough-shaped cross section comprising an outer wall 15, side walls 16 that extend toward the outer wall in the direction of the axis of the casing and flanges 17 that extend from the side walls in the direction of each other, said flanges 17 being of curved or arcuate cross section so as to form ducts or channels 18. The casing A is mounted on legs or supporting members 19. A spray pipe 20 consisting of a length of pipe bent to circular or annular form is disposed within the trough-shaped casing in such fashion as to rest on the wall portion 15 midway between the side walls 16, said spray pipe being provided at one end with a cap or closure 21, its other end being connected by a duct or pipe 22 having a valve 23 with a source of supply, such as a tank 24, having a filling opening 25 for the admission of the liquid to be utilized for spraying purposes, said filling opening being provided with a cap or closure 26. The tank also has an air inlet 27 which is provided in the customary manner with a check valve, said air inlet being adapted to be connected in any convenient manner with an air pump, not shown. A pressure gage 28 may be provided to indicate the pressure within the tank.

The wall portion 15 of the casing is provided at its lowermost point with an outlet with which a discharge pipe 29 is connected, said discharge pipe leading to a receptacle 30 for the reception of surplus liquid. A grating 31 is supported on the curved flange 18, said grating being positioned in the lower portion of the casing to support and to afford a foothold for animals driven through the casing.

In the operation of this invention, it will be seen that by opening the valve 23 the liquid contents of the tank 24 will be forced by the pressure of air contained in the upper portion of the tank into the spray pipe 20 and through the orifices 32 of said pipe, the liquid spray being directed toward the axis of the annular casing in such a manner as to impinge on animals driven through said casing, it being evident that every portion of the animals from the tip of the nose to the tip of the tail will be exposed to the spray. The grating 31 will afford a support and foothold for the animals. Any surplus liquid will be caught in the trough-shaped lower portion of the casing and partly in the ducts 18 formed by the flanges 17 at the upper portion of the casing, being from thence directed into the trough-shaped lower portion and from thence through the pipe 29 to the receptacle 30.

It is obvious that the device may be made of any desired dimensions and of any proportions as regards height and width that may be deemed most suitable and effective.

Having thus described the invention, what is claimed as new, is:—

1. In a device of the class described, an annular casing comprising an outer wall, side walls extending inwardly therefrom and curved flanges extending from the side walls in the direction of each other, supporting members for said casing whereby it may be sustained in an upright position, an annular spray pipe within the casing intermediate the side walls, said spray pipe being connected with a source of supply of liquid under pressure, and a discharge pipe leading from the bottom of the casing to a receptacle for surplus liquid.

2. In a device of the class described, an annular casing of trough-shaped cross section comprising an outer wall, side walls, and curved flanges extending from the side walls in the direction of each other, an annular spray pipe within the trough-shaped casing, and a grating supported on the curved flanges in the lower portion of the casing.

In testimony whereof we affix our signatures in presence of two witnesses.

WARREN T. HEAPS.
WILLIAM THACKERAY.

Witnesses:
CARRIE LANG,
WILLIAM I. BLAKE.

Copies of this patent may be obtained for five cents each, by addressing the "Commissioner of Patents, Washington, D. C."